United States Patent

Cortona et al.

[15] 3,641,317

[45] Feb. 8, 1972

[54] MACHINE FOR PROCESSING MAGNETIC LEDGER CARDS

[72] Inventors: Alessandro Cortona; Pietro Musso, both of Turin; Fabrizio Saltini, Modena; Giorgio Florenza, Milan, all of Italy

[73] Assignee: Ing. C. Olivetti & C., S.p.A., Turin, Italy

[22] Filed: Sept. 9, 1969

[21] Appl. No.: 856,392

[30] Foreign Application Priority Data

Sept. 14, 1968 Italy ................................53150 A/68

[52] U.S. Cl. ......................................235/61.11 D, 235/61.9

[51] Int. Cl. ..........................................................G06r 17/00

[58] Field of Search ....................235/61.11, 61.114, 61.113, 235/61.7, 61.9

[56] References Cited

UNITED STATES PATENTS

| | | | |
|---|---|---|---|
| 3,221,306 | 11/1965 | Hayes | 235/61.11 |
| 3,356,021 | 12/1967 | May et al. | 235/61.9 |
| 3,480,934 | 11/1969 | Miller et al. | 235/61.11 |
| 3,508,032 | 4/1970 | MacDuffee et al. | 235/61.11 |

*Primary Examiner*—Thomas A. Robinson
*Attorney*—Birch, Swindler, McKie & Beckett

[57] ABSTRACT

Machine for processing magnetic ledger cards comprising a hopper for receiving a ledger card with the magnetic strip parallel to the direction of the movement of insertion and a processing station formed by a substantially cylindrical path having means for circulating the card along said path, a magnetic head for reading and recording information on said magnetic strip and selectively operable means for ejecting the card from said cylindrical path.

12 Claims, 15 Drawing Figures

INVENTORS
ALESSANDRO CORTONA - PIETRO MUSSO
FABRIZIO SALTINI - GIORGIO FIORENZA
BY

ATTORNEYS

INVENTORS
ALESSANDRO CORTONA - PIETRO MUSSO
FABRIZIO SALTINI - GIORGIO FIORENZA
BY

ATTORNEYS

INVENTORS
ALESSANDRO CORTONA - PIETRO MUSSO
FABRIZIO SALTINI - GIORGIO FIORENZA
BY

ATTORNEYS

INVENTORS
ALESSANDRO CORTONA - PIETRO MUSSO
FABRIZIO SALTINI - GIORGIO FIORENZA
BY

ATTORNEYS

INVENTORS
ALESSANDRO CORTONA - PIETRO MUSSO
FABRIZIO SALTINI - GIORGIO FIORENZA
BY

ATTORNEYS

INVENTORS
ALESSANDRO CORTONA - PIETRO MUSSO
FABRIZIO SALTINI - GIORGIO FIORENZA
BY

ATTORNEYS

INVENTORS
ALESSANDRO CORTONA - PIETRO MUSSO
FABRIZIO SALTINI - GIORGIO FIORENZA
BY
ATTORNEYS

INVENTORS
ALESSANDRO CORTONA - PIETRO MUSSO
FABRIZIO SALTINI - GIORGIO FIORENZA
BY
ATTORNEYS

INVENTORS
ALESSANDRO CORTONA - PIETRO MUSSO
FABRIZIO SALTINI - GIORGIO FIORENZA
BY

ATTORNEYS

INVENTORS
ALESSANDRO CORTONA - PIETRO MUSSO
FABRIZIO SALTINI - GIORGIO FIORENZA
BY
ATTORNEYS

MACHINE FOR PROCESSING MAGNETIC LEDGER CARDS

CROSS-REFERENCE TO RELATED APPLICATION

Applicants claim priority from corresponding Italian Pat. application Ser. No. 53150-A/68, filed Sept. 14, 1968.

BACKGROUND OF THE INVENTION

1. Field of the Invention

The present invention relates to a machine for processing magnetic cards of the type provided with a magnetic strip on which there is recorded specific accounting information adapted to be read to condition the carrying out of an accounting operation.

2. Description of the Prior Art

Various machines are known for handling magnetic account cards of the aforesaid type, these being generally incorporated in an accounting apparatus or remote-controlled thereby. In one of these machines, the card moves with a reciprocating action within a straight hopper for the purpose of effecting in succession the operation of reading the recorded data, the printing in clear of the fresh processed data and the magnetic recording of the same fresh data. This machine is very complex owing to the difficulty of transmitting the motion to the card in the two opposite directions. Moreover, between one operation and the other it is always necessary to insert a separate stage for the alignment of the card, which is necessary for the magnetic reading and recording of the data. The machine is therefore very slow.

In another known machine, the card travels along an open track from an introduction hopper to an exit collecting device. Along the track there are disposed various stations for the alignment of the card both with respect to a head for reading the recorded data and with respect to another head for recording the data. This machine is therefore very complicated and costly.

SUMMARY OF THE INVENTION

The object of the invention is to produce a machine for processing magnetic account cards which obviates such drawbacks, enabling a single head to be used for recording and reading the data while causing the card to move at the maximum possible speed.

According to the invention there is provided a machine for processing magnetic cards of the type provided with a magnetic strip on which there is recorded specific accounting information adapted to be read to condition the carrying out of an accounting operation, the machine comprising a hopper for the insertion of a card into the machine with the magnetic strip parallel to the direction of the movement of insertion of the card, means for aligning the card against one side and against the base of the hopper, a substantially cylindrical structure in which the card is processed, means for moving the card inside the cylindrical structure and for keeping it constantly aligned against the said side, and a magnetic head disposed on the cylindrical structure for reading and recording information on the card.

DETAILED DESCRIPTION OF THE INVENTION

General Description

Figure 1:
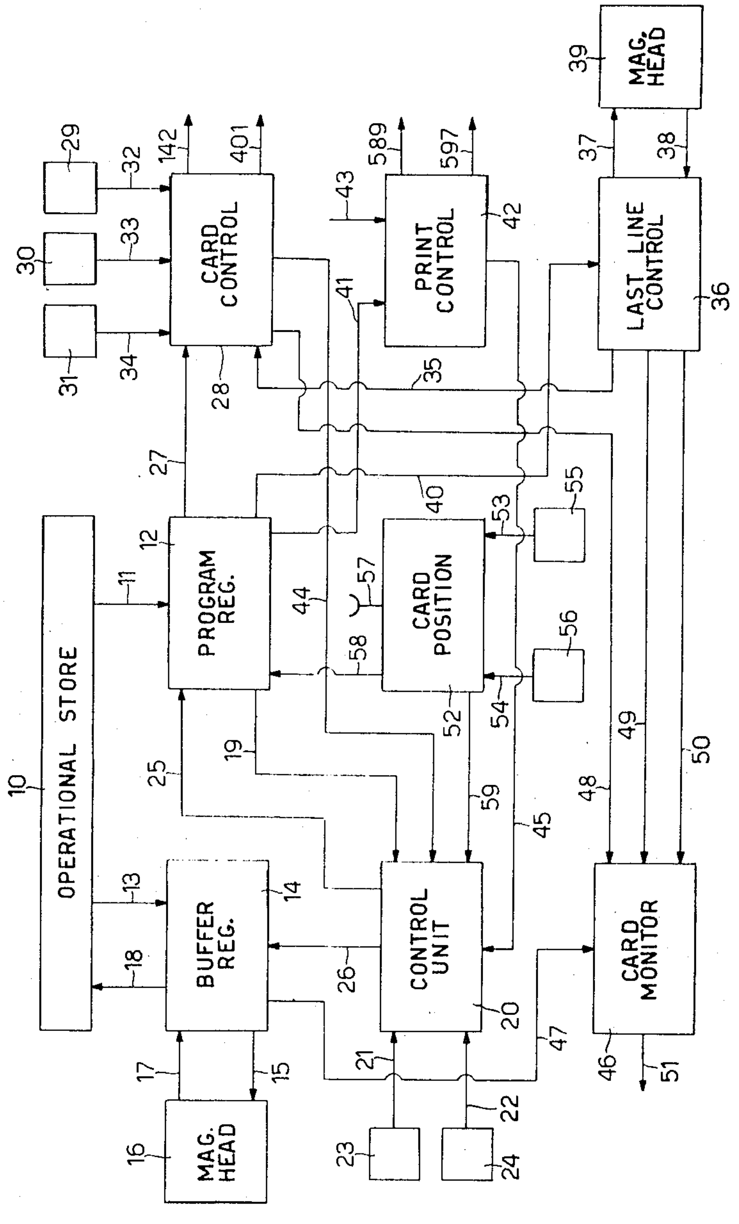
FIG. 1 a block diagram of the electronic control system of a machine embodying the invention.

The machine embodying the invention for processing magnetic account cards comprises an electronic unit for controlling the operations which the machine itself is to perform. This electronic unit is connected to a computing machine which is the basis of the entire accounting system and which may be, for example, the computing machine described in the specification of our U.S. Pat. No. 3,585,600. The information stored therein in an auxiliary magnetic tape store is sent to an operational store 10 (FIG. 1) of magnetostrictive delay line type in the form of macroinstructions which control both the internal operations and the external operations in the sequence most suitable for processing a given accounting document.

The information stored in the operational store 10 is divided into two parts, a first part constituted by the program instructions, which are sent via a cable 11 to a program register 12, and a second part constituted by the data which is sent via a cable 13 to a transit or buffer register 14 and from the latter, via a cable 15, to a magnetic head 16 for recording the data on the card.

The magnetic head 16 is moreover adapted to read the data recorded on the card and to transmit this via a cable 17 to the buffer 14 which, in turn, sends the data via a cable 18 to the operational store 10.

The program register 12 sends the instructions over a cable 19 to a control unit 20 which moreover receives the signals coming over two cables 21 and 22 from two photodiodes 23 and 24 which are influenced, in a manner which will be described hereinafter, by the movement of the card inside the machine. On the basis of these signals, the control unit 20 is adapted to send to the program register 12 over a cable 25 a series of signals adapted to actuate the instructions staticized in the register. The control unit 20 is moreover connected to the buffer 14 by means of a cable 26 and controls the input of the data into the buffer. The program register 12 controls by way of a cable 27 a unit 28 adapted to control the movements of the card in the machine. These movements are moreover conditioned by the signals originating from three microswitches 29, 30 and 31 by way of three cables 32, 33 and 34. The three microswitches 29, 30 and 31 are controlled by the movement of the card and indicate the current state of the card in the machine. The unit 28 is moreover controlled by way of a cable 35 by a unit 36 which is adapted to control, by way of two cables 37 and 38, the recording and reading by a magnetic head 39 of a magnetic spot on the card in correspondence with the last line which has been written. The unit 36, in turn, is controlled by the program register 12 by way of a cable 40.

The program register 12 moreover controls, by way of a cable 41, a unit 42 controlling the tabulation and the printing in clear on the card. The unit 42 received the data relating to the position to be reached in tabulation and relating to the character to be printed from the electronic unit of the basic computing machine over a cable 43.

The units 28 and 42 are respectively connected by way of cables 44 and 45 to the control unit 20 for the purpose of transmitting to the control unit the information relating to their current states.

The electronic unit of the machine moreover comprises a monitoring unit 46 adapted to receive the signals indicating an error in the reading of the data and originating from the buffer 14 by way of a cable 47, the signal indicating that a card is finished after a line-spacing operation and originating from the unit 28 by way of a cable 48 and the signals indicating that a card is finished and the absence of a magnetic positioning spot and originating from the unit 36 by way of two cables 49 and 50, respectively. The unit 46 sends these data over a cable 51 to the electronic unit of the basic machine, which is thus conditioned in the choice of the following instructions to be sent.

Finally, the electronic unit of the machine comprises a unit 52 which received by way of two cable 53 and 54 the signals of two microswitches 55 and 56 adapted to indicate the position of the card in the machine. Under the action of a manual key 57, these signals are sent over two cables 58 and 59 to the program register 12 and the control unit 20, respectively.

Figure 2:
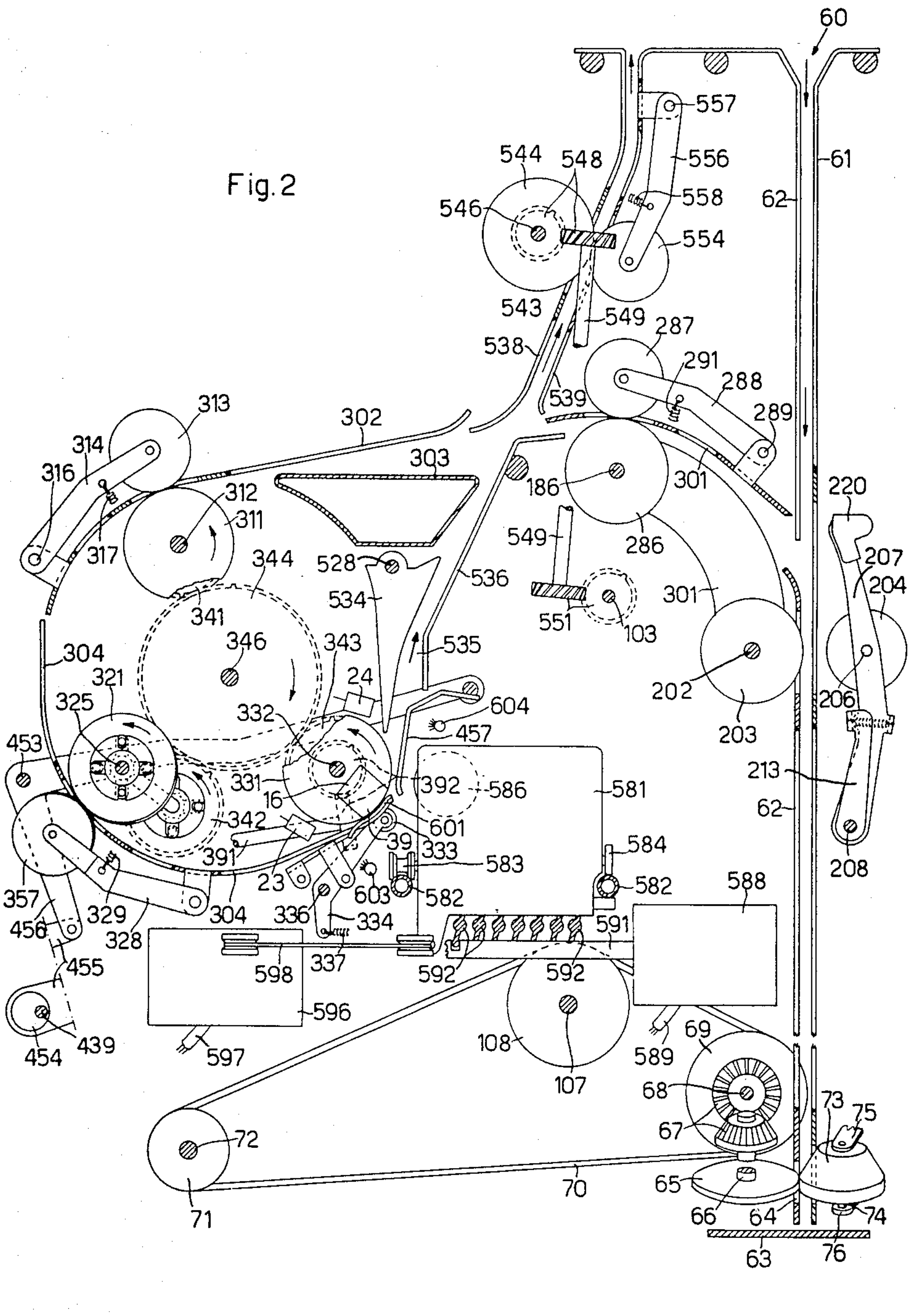
FIG. 2 is a side view from the left, partly in section, of the machine.
Figure 5:
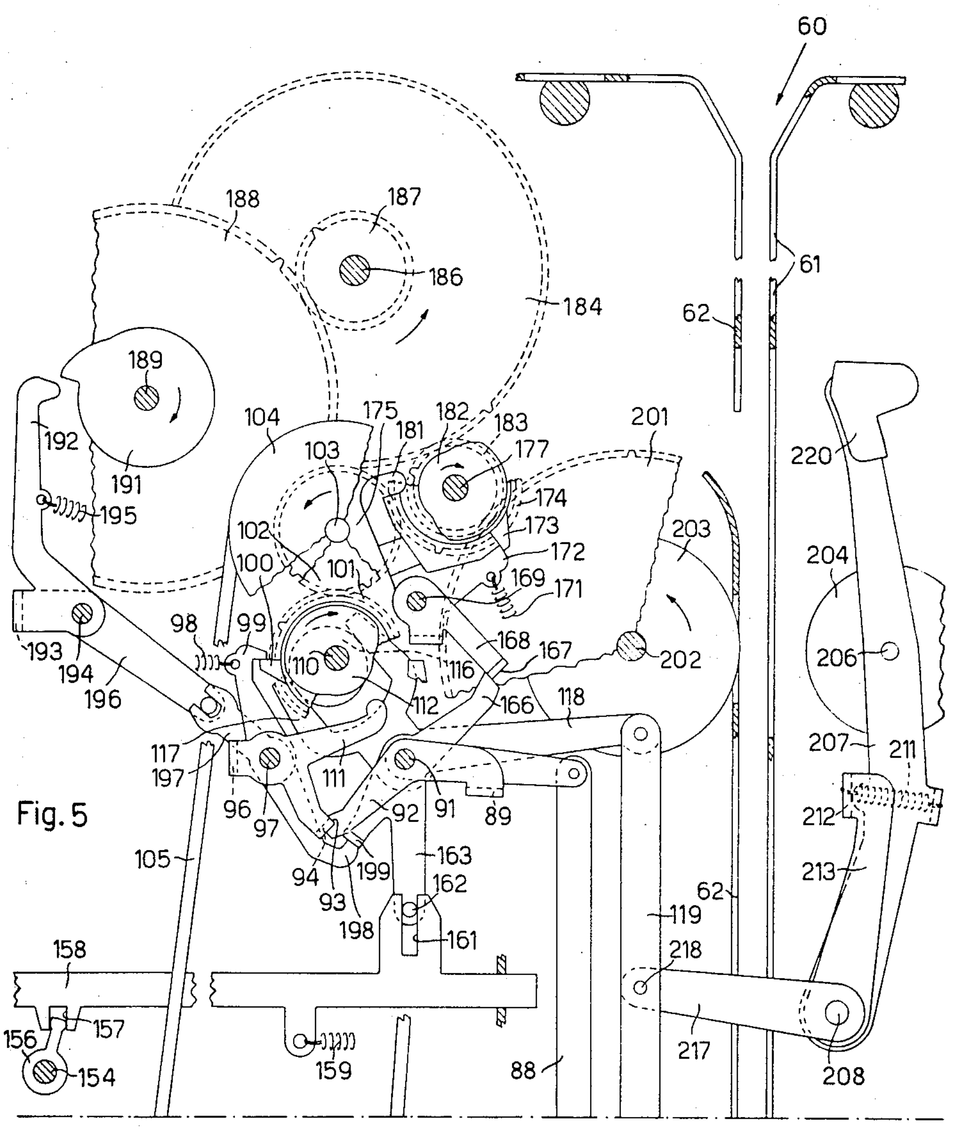
FIG. 5 and 6 are partial sections on the line V—V of FIG. 4.
Figures 6, 7:
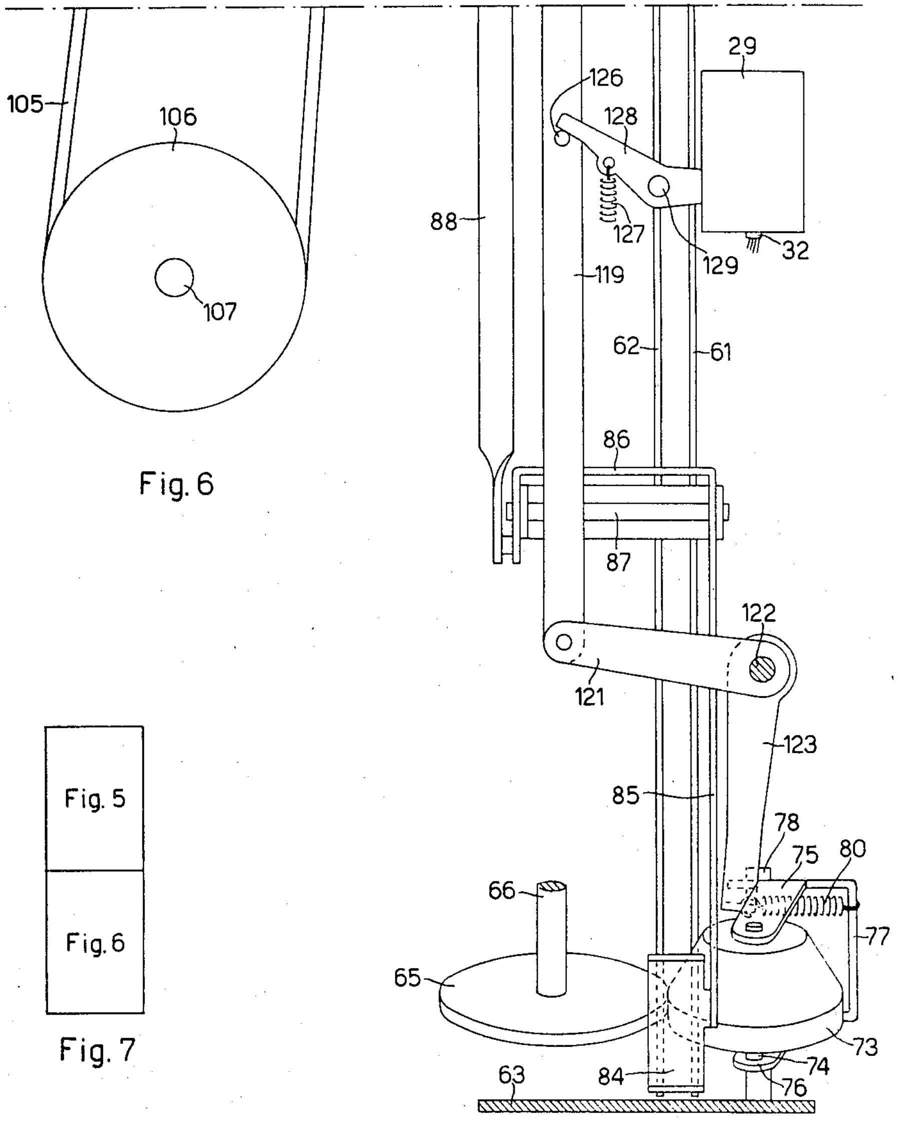
FIG. 7 is a combination diagram of FIGS. 5 and 6.

The machine for processing magnetic cards further comprises a hopper 60 (FIGS. 2, 5 and 6), adapted to receive the magnetic cards and constituted by a front wall 61 and a rear wall 62 for guiding the card as it drops towards a baseplate 63.

The wall 62 is provided with an aperture 64 through which there projects into the hopper a roller 65 inclined at an angle of 45° with respect to a horizontal plane and fixed to a shaft 66 rotatable in turn in the frame of the machine. The shaft 66 is connected by means of a pair of bevel gears 67 (FIG. 2) to a shaft 68 which is also rotatable in the frame of the machine. The shaft 68 is equipped with a pulley 69 connected by means of a toothed belt 70 to a pulley 71 on a main driving shaft 72 which is kept continuously in rotation by a conventional electric motor.

The roller 65 normally cooperates with a pressure roller 73 (FIG. 6) parallel to the roller 65 itself and rotatable on a spindle 74 carried by two lugs 75 and 76 of a bail 77 which can pivot in turn on a fixed spindle 78. The bail 77 is pulled by a spring 80 in such manner as to hold the roller 73 bearing against the roller 65.

Figure 3:
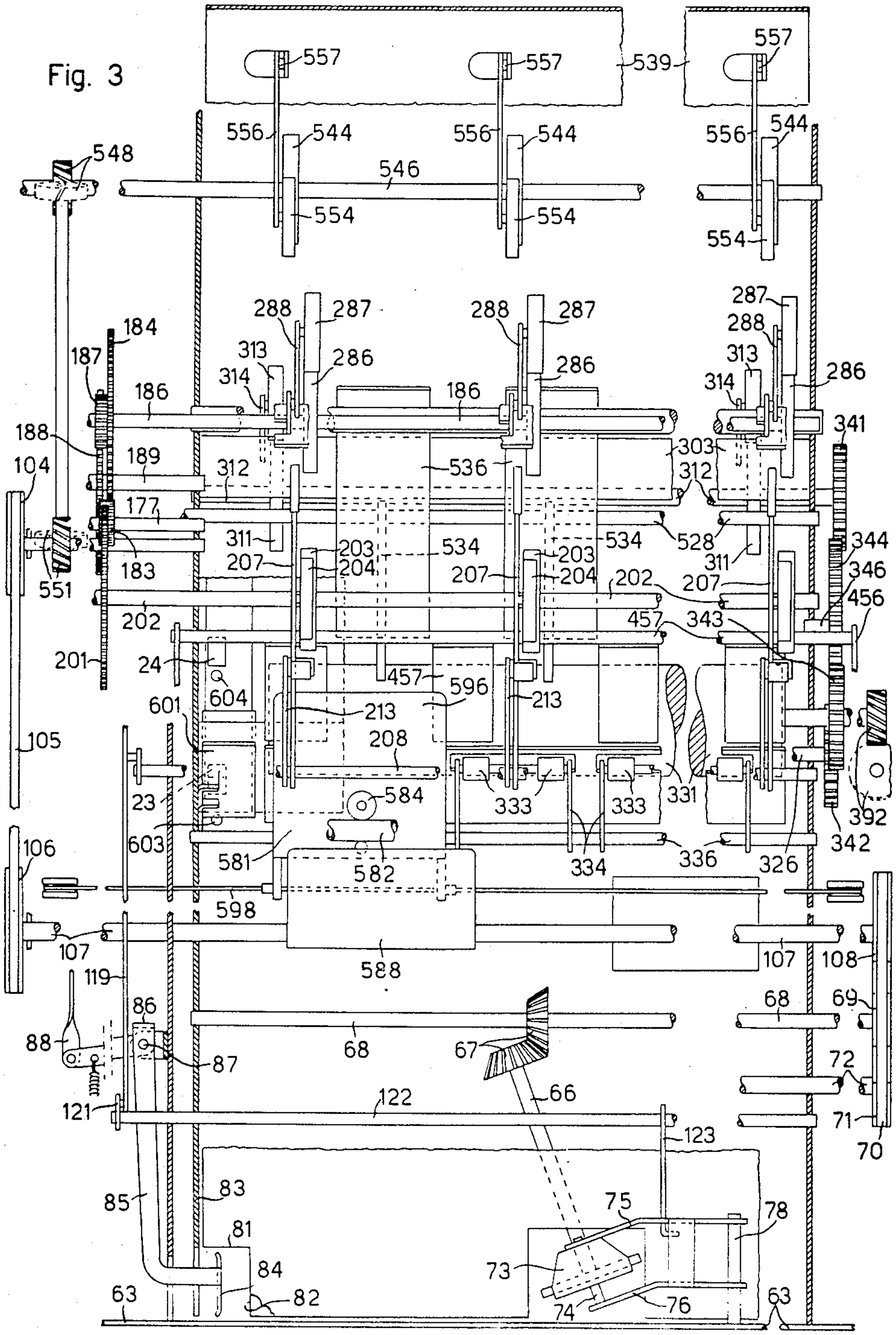
FIG. 3 is a front view of the machine.
Figure 4:
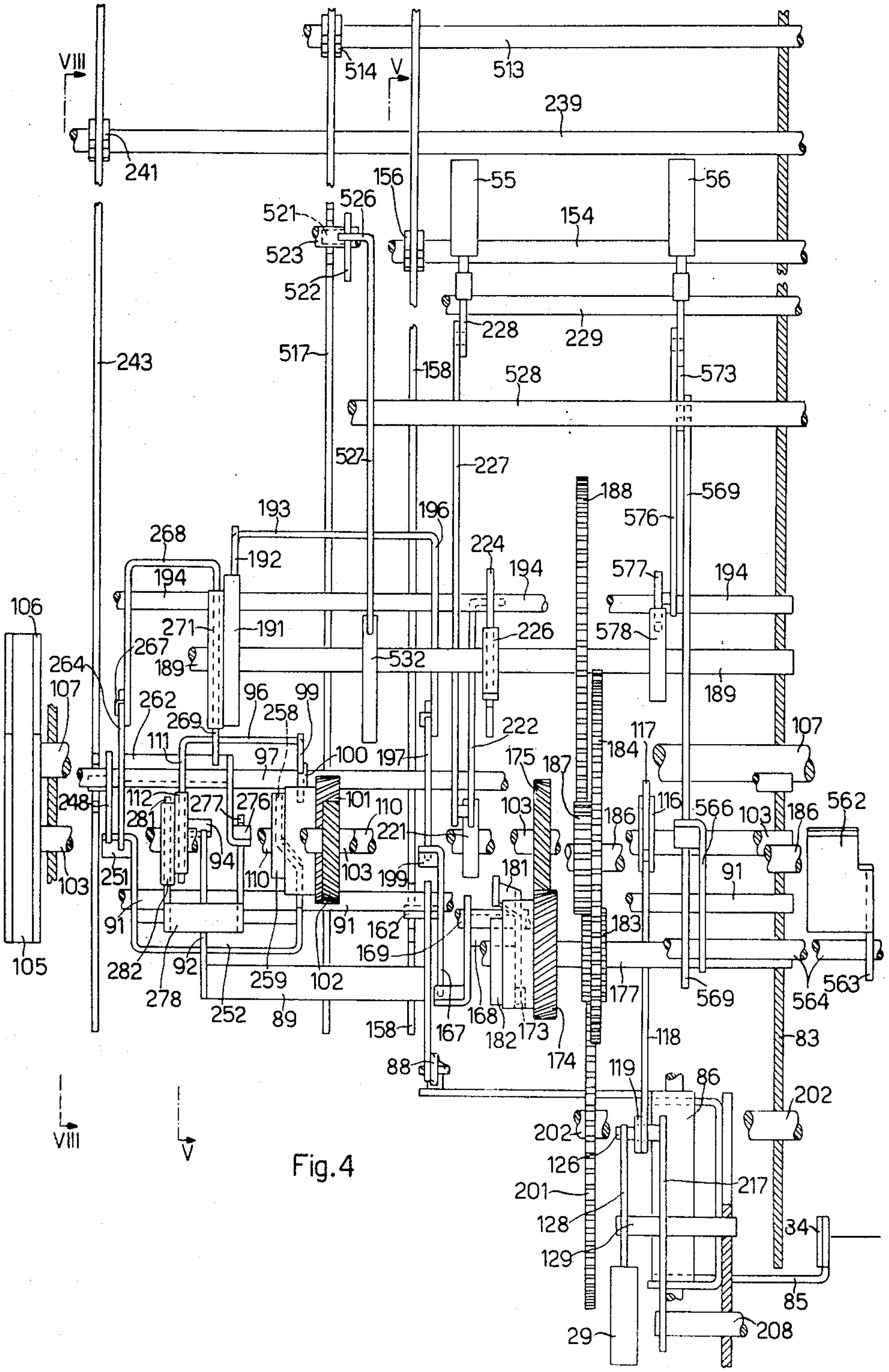
FIG. 4 is a plan view of one device in the machine.

The two walls 61 and 62 are provided with another pair of openings 81 and 82 respectively (FIG. 3) located at the left-hand end in correspondence with a sidewall 83 of the machine. Into these openings, there extends a lug 84 formed on an arm 85 of a bail 86 which can pivot on a fixed spindle 87 and is connected by a connecting rod 88 to a bail 89 (FIG. 5) pivoting on a fixed spindle 91. The bail 89 has an arm 92 in which there is formed a notch 93 engaging a lug 94 of another bail 96 pivoting on a fixed spindle 97. The bail 96 is pulled anticlockwise by a spring 98 and is provided with a stop 99 adapted to cooperate with a 180° clutch 100. The driving part of the clutch 100 is fast with a gear 101 in mesh with a gear 102 on a shaft 103. This shaft, in turn, is equipped with a pulley 104 connected by means of a toothed belt 105 to a pulley 106 on a shaft 107 to which movement is imparted from the main driving shaft 72 (FIG. 2) by way of the toothed belt 70 and a pulley 108. The driving part of the clutch 100 and the gear 101 are rotatable on a main shaft 110 forming the driven part of the clutch 100. The bail 96 (FIG. 5) is moreover provided with an arm 111 adapted to cooperate with a cam 112 on the main shaft 110. On the shaft 110 there is fixed an eccentric 116 engaged in a fork 117 of a lever 118 pivoted on the spindle 91 and connected by means of a connecting rod 119 to a crank 121 (FIG. 6) fixed to a shaft 122 which can turn in the frame of the machine. Also fixed to the shaft 122 is a crank 123 adapted to cooperate with the lug 75 of the bail 77.

The connecting rod 119 is provided with a stud 126 against which there normally bears, under the action of a spring 127, a lever 128 pivoted on a fixed pin 129 and adapted to control the microswitch 29. As described fully below, the roller 65 aligns the card against the bottom 63 and the lug 84 and thereby initiates certain operations via the switch 29.

The machine moreover comprises a series of five electromechanical transducers 141 (FIG. 9) each constituted by a followup electromagnet and substantially identical to the electromagnet 208 described in the specification of our U.S. Pat. application Ser. No. 791,666. These electromagnets are controlled by another start electromagnet, also described in the specification and are connected by means of a cable 142 to the card control unit 28 of the electronic control system of the machine.

A first electromagnet of the series of electromagnets 141 controls the operation of means which, when the card has been aligned at the bottom of the hopper, drive the card upwardly again and divert it into the cylindrical structure for data reading and recording. This first electromagnet is adapted to control a slider 146 connected to a lever 147 fulcrumed on a fixed spindle 148 and connected to a bar 149 guided in the frame of the machine and normally pulled forward by a spring 151. The bar 149 is provided with a fork 152 in which there is engaged a crank 153 fixed on a shaft 154 which can turn in the frame of the machine. On the shaft 154 there is fixed another crank 156 (FIG. 5) engaged in a fork 157 of a bar 158 guided in the frame of the machine and pulled forward by a spring 159.

The bar 158 is provided with a second fork 161 in which there is engaged a pin 162 of a lever 163 fulcrumed on the spindle 91. The lever 163 has a projection 166 adapted to cooperate with a lug 167 of a bail 168 turning on a fixed spindle 169. The bail 168 is pulled clockwise by a spring 171 and is provided with a projection 172 adapted to control a clutch 173. The driving part of the clutch 173 is fast with a gear 174 meshing with a gear 175 on the shaft 103. The driving part of the clutch 173 and the gear 174 are rotatable on a main shaft 177 forming the driven part of the clutch 173. The bail 168 is moreover provided with an arm 181 adapted to cooperate with a cam 182 on the shaft 177.

On the shaft 177 there is fixed a gear 183 coupled with a gear 184 on a shaft 186 rotatable in the frame of the machine. Another gear 187 is fixed on the shaft 186, this gear being coupled in turn with a gear 188 on a shaft 189 rotatable in the frame of the machine. The transmission ratios between the gears 182 and 183 and between the gears 187 and 188 are such that the transmission ratio between the shaft 177 and the shaft 189 is 14:1.

Fixed on the shaft 189 is a cam 191 adapted to cooperate with an arm 192 of a bail 193 turning on a fixed spindle 194 and pulled clockwise by a spring 195. The bail 193 is connected by means of a second arm 196 to a lever 197 pivoted on the spindle 97 and normally bearing under the action of the spring 195 and by means of a projection 198 against a lug 199 of the lever 163.

The gear 183 is moreover coupled with a gear 201 fixed on a shaft 202 rotatable in the frame of the machine. On the shaft 202 there is mounted a series of feed rollers 203 for the card, each of which is adapted to cooperate with a corresponding card-pressing roller 204 rotatable on a pin 206 provided on a lever 207. The levers 207 are all fulcrumed on a shaft 208 which, in turn, is rotatable in the frame of the machine and each of these levers is held by a spring 211 so that it bears against a lug 212 of a corresponding crank 213. The cranks 213 are fixed on the shaft 208, which carries another crank 217 connected by means of a pin 218 to the connecting rod 119.

Each lever 207 terminates in a curved projection 220 adapted to enter the hopper 60 and to form a deflector for the card introduced into the hopper and which is to be set moving inside the machine for processing the data. The upper portions of the projections 220 are moreover adapted to block the hopper 60 and prevent the introduction of fresh cards.

Figures 10, 15:
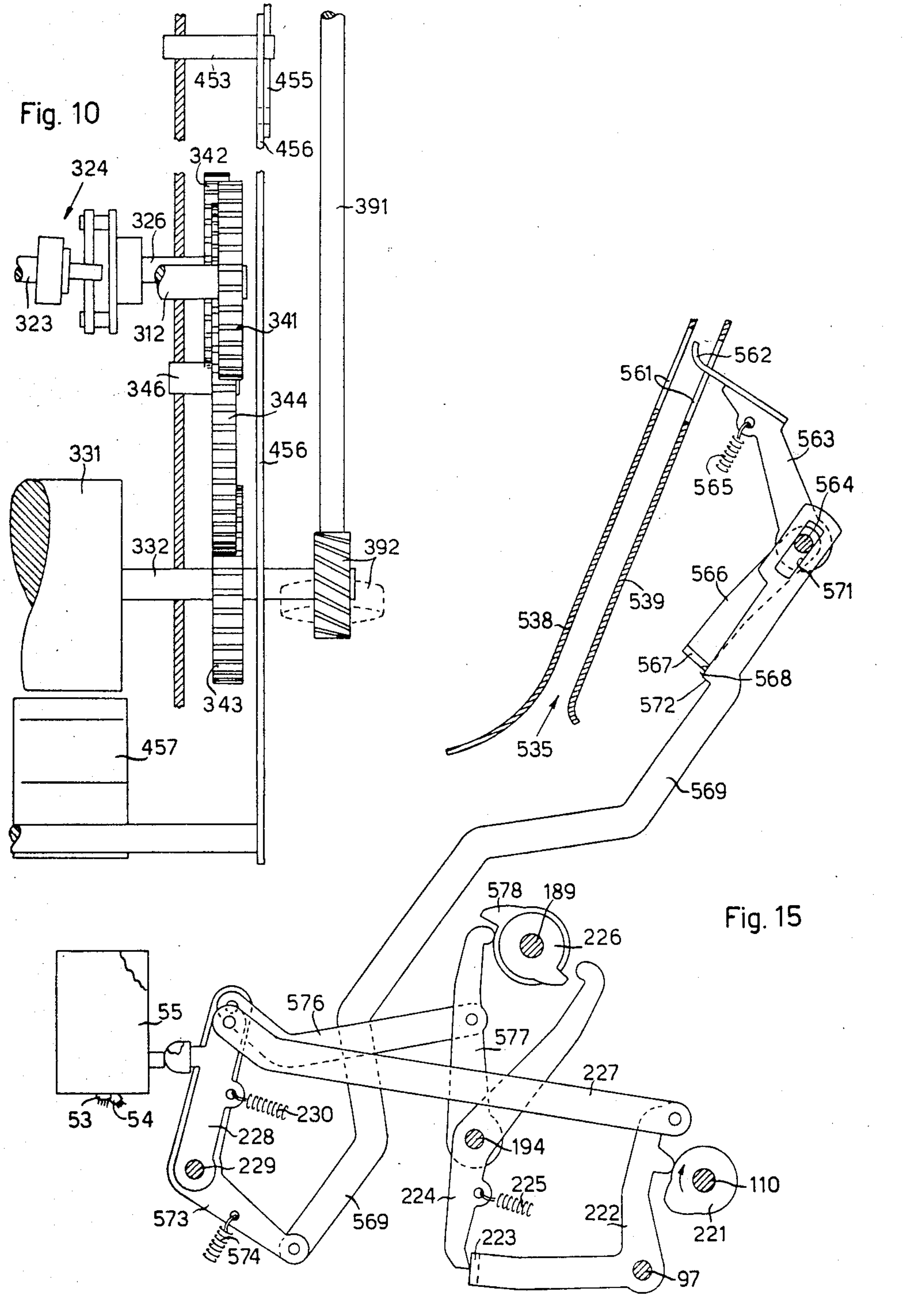
FIG. 10 is a plan view of a detail of the machine.
FIG. 15 is a side view of a number of details of FIG. 4.

A cam 221 (FIG. 15) adapted to cooperate with a lever 222 fulcrumed on the spindle 97 is fixed on the shaft 110. The lever 222 has a lug 223 adapted to cooperate with a lever 224 fulcrumed on the spindle 194 and adapted to cooperate under the action of a spring 225 with a cam 226 on the shaft 189. The lever 222 is connected by means of a connecting rod 227 to a crank 228 fulcrumed on a fixed spindle 229 and pulled clockwise by a spring 230. The crank 228 is adapted to control the microswitch 55, which signals that a card is in the hopper.

Figure 8:
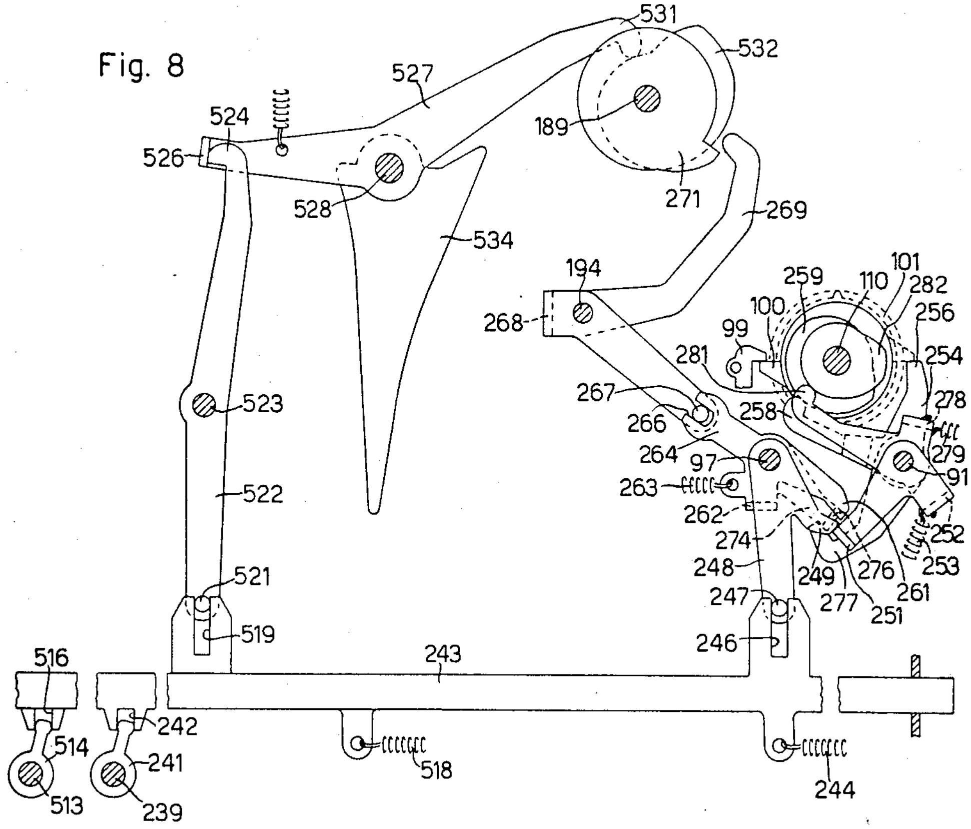
FIG. 8 is a partial section on the line VIII—VIII of FIG. 4.

A second electromagnet of the series of electromagnets 141 (FIG. 9) is adapted to free the hopper for introduction of a fresh card and controls a slider 231 connected to a lever 232 fulcrumed on the spindle 148 and connected to a bar 234 guided in the frame of the machine and normally pulled forward by a spring 236. The bar 234 is provided with a fork 237 in which there is engaged a crank 238 fixed on a shaft 239 turning in the frame of the machine. To the shaft 239 there is fixed another crank 241 (FIG. 8) engaged in a fork 242 of a bar 243 guided in the frame of the machine and pulled forward by a spring 244.

The bar 243 is provided with a second fork 246 in which there is engaged a pin 247 of a lever 248 fulcrumed on the spindle 97. The lever 248 has a projection 249 adapted to cooperate with a lug 251 of a bail 252 turning on the spindle 91. The bail 252 is pulled clockwise by a spring 253 and is provided with an arm 254 terminating in a projection 256 disposed in a position opposite and the projection 99 of the bail 96 with respect to the shaft 110 and adapted to control the clutch 100. The bail 252 has another arm 258 adapted to cooperate with a cam 259 on the shaft 110.

The lug of the bail 252 is moreover adapted to cooperate with a projection 261 of a bail 262 which can turn on the spindle 97 and is pulled clockwise by a spring 263. The bail 262 is provided with an arm 264 terminating in a slot 266 in which there is engaged a pin 267 of a bail 268 turning on the spindle 194. The bail 268 is provided with an arm 269 adapted to cooperate with a cam 271 on the shaft 189.

Finally, the bail 262 is provided with an arm 274 having a lug 276 normally bearing against a projection 277 of a bail 278 which can turn on the spindle 91 and is pulled clockwise by a spring 279. The bail 278 is provided with an arm 281 adapted to cooperate with a cam 282 fixed on the shaft 110.

The shaft 186 (FIG. 2) carries a series of rollers 286 each of which cooperates with a card-pressing roller 287 carried by a crank 288 pivoting on a fixed pin 289 and pulled anticlockwise by a spring 291. The rollers 286 and 287 are adapted to cause the card to advance in order to carry it from the introduction and aligning hopper 60 to a processing track. The card is guided along this intermediate path by a pair of shaped plates 301 and thereafter by two plates 302 and 303 which form the entrance of a cylindrical structure constituting the processing track. This structure is formed by a series of shaped plates 304 inside which the card itself travels.

The card inside the cylindrical structure is fed by a first series of rollers 311 fixed on a shaft 312 rotatable in the frame of the machine. Each roller 311 cooperates with a card-pressing roller 313 carried by a crank 314 turning on a fixed pin 316 and pulled clockwise by a spring 317.

Figure 11:
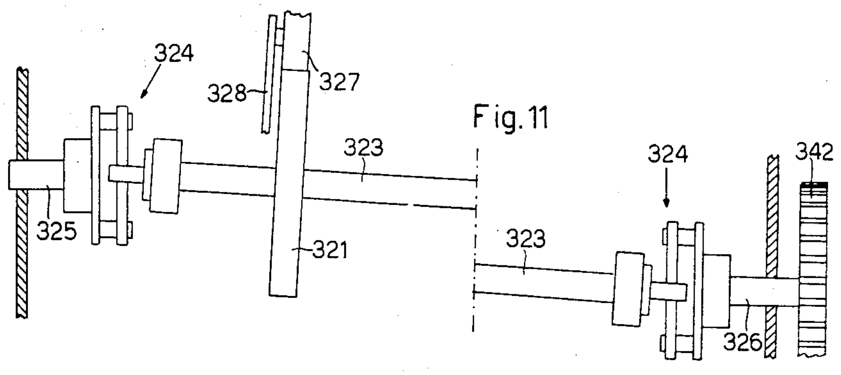
FIG. 11 is a plan view of another detail of the machine.

Continuing its advance, the card is then seized by a roller 321 (FIG. 11) arranged so that it is inclined with respect to the side of the machine in such manner as to urge the card against the left side of the cylindrical structure. The roller 321 is mounted on a shaft 323 which is also inclined and is rotatable in the frame of the machine. The shaft 323 is connected through the medium of a pair of flexible couplings 324 to two horizontal shafts 325 and 326 rotatable in turn in the frame of the machine. The roller 321 cooperates with a card-pressing roller 327 (FIG. 2) parallel to the roller 321 and carried by a crank 328 which can turn in the frame of the machine and is pulled clockwise by a spring 329.

The card is finally seized by a platen 331 fixed on a shaft 332 rotatable in the frame of the machine. The platen 331 cooperates with a series of card-pressing rollers 333 each of which is carried by a crank 334 pivoting on a fixed spindle 336 and pulled anticlockwise by a spring 337.

The shafts 312, 326 and 332 are provided with gears 341, 342 and 343, respectively. All these gears are coupled to a gear 334 rotatable on a fixed pin 346. The gear 344 thus couples the three shafts 312, 326 and 332, which consequently rotate in synchronism.

The motion is transmitted to the card by a driving shaft 351 (FIG. 12) rotatable in the frame of the machine and equipped with a pulley 352 connected by means of a toothed belt 353 to a pulley 354 fixed on a shaft 355 rotatable in turn in the frame of the machine. By way of a coupling between two helical spur gears 356, the shaft 355 transmits the rotation to a sleeve 357 rotatable on a shaft 358 rotatable in turn in the frame of the machine.

The sleeve 357 constitutes the driving part of a clutch 360 the driven part of which is constituted by a sleeve 359 slidable on the shaft 358 and fast therewith for rotation by means of a pin and slot coupling 361. The sleeve 359 is moreover guided on a fixed bearing 362 and is urged forward by a spring 363 acting on the bearing 362 and on a shoulder 364 inside the sleeve.

The sleeve 359 terminates at the rear in a disc 366 adapted to cooperate with a circular ring 367 made of rubber or cork or other material having a high coefficient of friction. The circular ring 367 is fixed to a disc 368 guided on the bearing 362 and on a series of pins 369 which are carried by a second fixed disc 371. The disc 368 is urged forward by a series of springs 372 wound around the pins 369.

The shaft 358 is connected through two helical-toothed gears 376 to a sleeve 378 (FIG. 9) rotatable on a shaft 379, which is rotatable in the frame of the machine. The sleeve 378 is equipped with a bevel gear 381 meshing with a bevel gear 382 rotatable on a pin 383 on the shaft 379. The bevel gear 382 moreover meshes with a bevel gear 384 fixed to a sleeve 386 rotatable on the shaft 379. The gears 381, 382 and 384 form a differential, the gears 381 and 384 of which constitute the sun gears and the gear 382 a planet gear.

The shaft 379 is connected through a pair of helical-toothed gears 388 to a shaft 391 rotatable in the frame of the machine. Finally, the shaft 391 is connected through a pair of helical-toothed gears 392 (FIG. 10) to the shaft 332 which carries the platen 331. The movement is thus transmitted through the gears 341, 342 and 344 to the shafts 312 and 326 which, together with the platen 331, provide for the feed of the card inside the cylindrical structure.

The clutch 360 (FIG. 12) is controlled by an electromagnet 400 which cooperates with an armature 402 mounted on a crank 403 which can turn on a fixed pin 404 and is pulled anticlockwise by a spring 406. The electromagnet 400 is supplied through a series of voltage and current amplifiers by a cable 401 extending from the electronic card control unit 28. The crank 403 is provided with a notch 408 with which there cooperates a lug 409 formed on an arm 411 of a bail 412 which can turn on a fixed spindle 413 and is pulled clockwise by a spring 414. The bail 412 is provided with a second arm 416 (FIG. 9) and on each of the two arms 411 and 416 there is mounted a roller 418. The two rollers 418 are adapted to press on the disc 366 at two diametrically opposite points.

The bail 412 is moreover provided with an arm 421 adapted to cooperate with a lug 422 of a bail 423 turning on a fixed spindle 424 and pulled anticlockwise by a spring 426. The bail 423 has an arm 428 adapted to control a clutch 429. The driving part of the clutch 429 is fast with a gear 431 meshing with a gear 432 on the shaft 355. The driving part of the clutch 429 and the gear 431 are rotatable on a main shaft 434 constituting the driven part of the clutch 429.

On the shaft 434 there are fixed a cam 435 adapted to cooperate with another arm 436 of the bail 423 and a gear 437 meshing with a gear 438 on a shaft 439 rotatable in the frame of the machine. The transmission ratio between the gear 437 and the gear 438 is 2:1.

On the shaft 439 there is fixed a cam 440 adapted to cooperate with an arm 441 of the bail 412. Moreover, on the shaft 439 there is fixed a cam 442 adapted to cooperate with an arm 443 of a bail 444 which can turn on the spindle 413 and is pulled clockwise by a spring 445. The bail 444 is provided with a second arm 446 adapted to cooperate with a lug 422 of the bail 423, and with a third arm 447 adapted to cooperate with a lug 448 of a bar 449 (FIG. 9) guided in the frame of the machine and pulled forward by a spring 450.

The bar 449 is connected to a lever 451 fulcrumed on the spindle 148 and connected to a slider 452 which is controlled by one of the five followup electromagnets 141, for instituting a recording cycle on the card and subsequently ejecting the same.

Fixed on the shaft 439 is an eccentric 454 (FIGS. 2 and 9) embraced by a connecting rod 455 which is connected to a lever 456 fulcrumed on a fixed pin 453. The lever 456 carries a series of shaped plates 457 normally adapted to form a portion of the cylindrical guide for the card.

On the shaft 439 there is fixed another cam 458 (FIG. 13) adapted to cooperate with a lever 459 fulcrumed on the spindle 413 and pulled anticlockwise by a spring 460. The lever 459 is adapted to operate the microswitch 30.

Another electromagnet in the series of electromagnets 141 is adapted to control the translation of a slider 466 (FIG. 12) which controls line-spacing and is normally disposed to the rear and connected to a lever 467 fulcrumed on the spindle 148. The lever 467 is moreover connected to a bar 468 guided in the frame of the machine and pulled forward by a spring 469. The bar 468 is equipped with a pin 471 engaged in a slot 472 in a lever 473 fulcrumed on a fixed spindle 474.

The lever 473 has a projection 476 cooperating with the lug 477 of the lever 478 fulcrumed on a fixed spindle 479 and pulled anticlockwise by a spring 481. The lever 478 has a slot 482 in which there engages a pin 483 of a bail 484 which can turn on the spindle 474. The lever 478 and the bail 484 are provided with stops 486 and 488, respectively, which are adapted to control a clutch 489. The driving part of the clutch 489 is fast with a gear 491 meshing with a gear 492 on the shaft 355. The driving part of the clutch 489 and the gear 491 are rotatable on a main shaft 494 forming the driven part of the clutch 489. The bail 484 is moreover provided with an arm 496 adapted to cooperate with a cam 497 for recovering the bail 484 itself and the lever 478 connected to it.

The shaft 494 is connected through a pair of helical-toothed gears 498 (FIG. 9) to a shaft 499 rotatable in the frame of the machine and connected in turn through a pair of helical-toothed gears 500 to the sleeve 386.

Finally, on the shaft 494 there is fixed a cam 501 (FIG. 14) cooperating with a lever 502 fulcrumed on the spindle 474 and pulled clockwise by a spring 503. The lever 502 is adapted to operate the microswitch 31.

The last followup electromagnet in the series of electromagnets 141 is involved in the final ejection of a card and controls a slider 507 normally disposed towards the rear of the machine and connected to a lever 508 fulcrumed on the spindle 148. The lever 508 is connected in turn to a bar 509 guided in the frame of the machine and pulled forward by a spring 510. The bar 509 is provided with a slot 511 in which there engages a crank 512 fixed on a shaft 513 rotatable in the frame of the machine. The shaft 513 carries a second crank 514 engaged in a slot 516 of a bar 517 guided in the frame of the machine and pulled forward by a spring 158. The bar 517 is provided with another slot 519 in which there is engaged a pin 521 of a lever 522.

The lever 522 is fulcrumed on a fixed spindle 523 and has a projection 524 adapted to cooperate with a lug 526 of a lever 527 fixed on a shaft 528 rotatable in the frame of the machine. The lever 527 moreover has a projection 531 adapted to cooperate with a cam 532 on the shaft 189.

On the shaft 528 there is fixed a series of fingers 534 which normally form with the rear face a portion of the cylindrical guide structure for the card and with the front face a portion of an exit guide 535 (FIG. 2) for the card.

The exit guide 535 for the card is constituted in its first portion by the front face of the fingers 534 and by a plate 536 and thereafter by a pair of plates 538 and 539 adapted to guide the card as far as an exit slot. The plate 538 is provided with a series of aperture 543 through which there projects a series of rollers 544 fixed on a shaft 546 rotatable in the frame of the machine.

The shaft 546 is connected through a pair of helical-toothed gears 548 to a shaft 549 rotatable in the frame of the machine. The shaft 549, in turn, is connected through a pair of helical-toothed gears 551 to the driving shaft 103. Each roller 544 cooperates with a corresponding card-pressing roller 554 rotatable on a crank 556 which is fulcrumed on a fixed pin 557 and is pulled clockwise by a spring 558.

The exit guide 535 for the card is provided with an opening 561 (FIG. 15) in which there is inserted a lug 562 of a crank 563 fixed to a shaft 564 which can turn in the frame of the machine. The crank 563 is pulled anticlockwise by a spring 565. On the shaft 564 there is fixed a crank 566 provided with a lug 567 normally bearing against a first shoulder 568 of a connecting rod 569 guided on the shaft 564 by means of a slot 571. The connecting rod 569 is provided with a second shoulder 572 which is also adapted to cooperate with the lug 567 of the crank 566. The connecting rod 569 is connected to a lever 573 fulcrumed on the pin 229 and pulled clockwise by a spring 574. The lever 573 is adapted to operate the microswitch 56 and is moreover connected by means of a link 576 to a crank 577 fulcrumed on the spindle 194 and adapted to cooperate with a cam 578 fixed on the shaft 189.

The machine also comprises a printing device 581 (FIG. 2) slidable transversely on two rods 582 by means of a pair of pulleys 583 and a pair of rollers 584. The device 581 comprises a series of printing elements 586 constituted by type wheels. The selection of the character to be printed is effected by a printing control unit 588 connected through a cable 589 to the unit 42 of the electronic control system of the machine. By means of a series of sliders 591, the unit 588 controls the selective positioning of a series of code bars 592 which, in turn, effect the selection of the type wheels 586. The type wheels 586 are disposed in correspondence with the platen 331 and are normally separated therefrom by the plates 457.

The machine also comprises a control unit 596 for the tabulation of the printing device 581, for example as described in the specification of our U.S. Pat. application Ser. No. 790,291. The unit 596 is connected by means of a cable 597 to the unit 42 of the electronic control system of the machine. The unit 596 controls the movement and positioning of the printing device 581 by means of a steel wire 598.

The two magnetic heads 16 and 39 are side by side and are arranged to the left of the platen in the position in which the card has the magnetic strip. The card is pressed against the magnetic heads 16 and 39 by a resilient plate 601 fixed to the frame of the machine. The photodiode 23 is normally illuminated by a lamp 603 and is arranged below the platen 331. Finally, the photodiode 24, normally illuminated by a lamp 604, is arranged above the platen 331.

OPERATION

The machine can process the magnetic cards in accordance with various types of program in dependence upon the operations which it is desired to carry out on the card itself and on the conditions obtaining in the card introduced, which may be a new card or a card already containing data.

INTRODUCTION OF THE CARD AND ALIGNMENT

The card is introduced into the hopper 60 (FIGS. 5 and 6) and falls towards the baseplate 63. In the course of its movement towards the bottom, the card is seized by the roller 65 which is kept continuously in motion, and by the roller 73, which bears against the roller 65. The card is pushed against the baseplate 63 and against the left-hand sidewall 83 (FIG. 3), as a result of which it is located in a well-defined position with the magnetic strip parallel to the sidewall 83. The alignment is necessary for the magnetic reading and recording.

The card bears against the lug 84 and causes the bail 86 to turn clockwise and push the connecting rod 88 upwardly. This connecting rod, in turn, causes the bail 89 (FIG. 5) to turn anticlockwise and release the lug 94 of the bail 96 from the notch 93 in the bail 89. The bail 96 turns anticlockwise, bringing the arm 111 against the cam 112. The stop 99 release the dog of the clutch 100, which closes or engages, as a result of which the shaft 110 begins to revolve and performs a rotation of 180° after which the dog of the clutch 100 encounters the projection 256 (FIG. 8) of the bail 252 and the clutch 100 is reopened.

The cam 282 (FIG. 8) causes the bail 278 to turn anticlockwise and removes the projection 277 from the path of the lug 276 of the bail 262, which turns clockwise under the action of the spring 263, causing the bail 268 to turn anticlockwise until the arm 269 bears against the cam 271 on the shaft 189. The cam 282 then represents the low portion of its profile to the arm 281, but the bail 278 is prevented from rotating clockwise by the engagement of the projection 277 with the lug 276 of the bail 262.

The cam 259 also rotates through 180° and presents the low portion of its profile to the arm 258 of the bail 252 which, however, is maintained in the position shown in the drawing by the engagement of a lug 251 with the projection 249 of the lever 248 and with the projection 261 of the bail 262.

The shaft 110 also causes the cam 221 (FIG. 15) to rotate through 180° and this cam causes the lever 222 to turn anticlockwise. The lug 223 is removed from the path of the lever 224, which turns under the action of the spring 225 until it bears against the cam 226 on the shaft 189.

Through the connecting rod 227, the lever 222 causes the crank 228 to turn anticlockwise, thus acting on the microswitch 55, which sends to the electronic unit 52 (FIG. 1) by way of the cable 53 the information that the card is present in the hopper 60.

The cam 221 (FIG. 15), continuing its rotation, once again presents the low portion of its profile to the lever 222, but the lever 222 is prevented from turning clockwise by the engagement of the lug 223 with the lever 224.

Finally, the shaft 110 causes the eccentric 116 (FIG. 5) to rotate through 180° and the eccentric causes the lever 118 to turn clockwise and moves the connecting rod 119 downwardly. Through the crank 121 (FIG. 6) this connecting rod causes anticlockwise rotation of the shaft 122 and, therefore, of the crank 123, which bears against the lug 75 and causes the bail 77 to turn in such manner as to move the roller 73 away from the roller 65, thus releasing the card.

The connecting rod 119 moreover causes anticlockwise rotation of the crank 217 (FIG. 5) and, therefore, of the shaft 208 and the cranks 213. The levers 207 follow the rotation of the cranks 213 under the action of the respective springs 211 until the rollers 204 bear against the corresponding rollers 203.

The card is thus engaged by these rollers which, however, are stationary. The projections 220 enter the hopper 60 and are able to deflect the card towards the interior of the machine. Moreover, the upper portion of the projections 220 prevents the introduction of a new card.

Finally, the connecting rod 119 allows the lever 128 (FIG. 6) to pivot anticlockwise and this lever acts on the microswitch 29 which sends to the unit 28 (FIG. 1) through the cable 32 the information that the card is aligned.

INSERTION OF THE CARD INTO THE CYLINDRICAL STRUCTURE FOR PROCESSING

In response to the information that the card is aligned, the electronic unit 28 is enabled to send a first series of signals to the electromagnets 141 (FIG. 9) through the cable 142. The execution of these signals leaves the sliders 466, 452, 507 and 231 stationary and causes the slider 146 to move forward. The lever 147 is turned anticlockwise and causes the bar 149 to move backward. Through the crank 153 (FIG. 12), this bar causes anticlockwise rotation of the shaft 154 and, therefore, of the crank 156 (FIG. 5), which shifts the bar 158 backward.

The lever 163 is turned clockwise by means of the form 161 and the pin 162 and removes the lug 199 from the path of the lug 198 of the lever 197, which turns anticlockwise, while the bail 193 turns clockwise until it bears by means of the arm 192 against the cam 191 on the shaft 189. The return to rest of the lever 163 is then prevented by the engagement of the lever 163 with the projection 198 of the lever 197.

The lever 163 moreover removes the projection 166 from the path of the lug 167 of the bail 168, which can therefore turn clockwise until it bears by means of the arm 181 against the cam 182 on the shaft 177. The bail 168 removes the projection 172 from the path of the dog of the clutch 173, which closes. The shaft 177 begins to rotate and, through the couplings between the gear 183 and the gears 184 and 201, sets the shafts 186 and 202 in anticlockwise rotation.

The rollers 203, in cooperation with the rollers 204, carry the card upwardly. The card, guided by the projections 220 and by the plates 301 thereafter comes into engagement with the rollers 286 on the shaft 186 and, therefore, guided by the plates 302 and 303 (FIG. 2) enters the interior of the cylindrical structure for processing.

The upward movement of the card releases the lug 84 (FIG. 3) of the bail 86, which can therefore turn anticlockwise and return to the inoperative position. By way of the connecting rod 88, the bail 86 causes the bail 89 (FIG. 5) to turn clockwise and bring the notch 93 back into the path of the lug 94 of the bail 96, which has been returned to the inoperative position by the cam 112.

Owing to the coupling between the gears 187 and 188, the shaft 186 sets the shaft 189 in rotation. The cards are of a fixed length such as to require fourteen revolutions of the shaft 177 and, therefore, one revolution of the shaft 189 for their introduction into the processing track. Towards the end of this revolution, the cam 191 on the shaft 189 causes the bail 193 to turn anticlockwise and, therefore, the lever 197 to turn clockwise, this lever removing the projection 198 from the path of the lug 199 of the lever 163. At the same time, the cam 182 causes the bail 168 to turn anticlockwise, as a result of which the lever 163 is free to turn anticlockwise until it brings the projection 166 into the path of the lug 167 of the bail 168. The projection 172 of the bail 168 is brought into the path of the dog of the clutch 173, which is thus reopened after fourteen revolutions of the shaft 177.

As the shaft 189 rotates, it also rotates the cam 226 (FIG. 15), which causes the lever 224 to turn clockwise and release the lug 223 of the lever 222. The lever 222 turns clockwise until bears against the cam 221 on the shaft 110 and, through the connecting rod 227, also causes clockwise rotation of the crank 228, which acts on the microswitch 55. The microswitch 55 sends to the electronic unit 52 (FIG. 1) through the cable 53 the information that the card is no longer present in the hopper 60.

The shaft 189 moreover causes the cam 578 (FIG. 15) to rotate and said cam, in turn causes the crank 577 to turn anticlockwise. By means of the link 576, the crank 577 causes the lever 573 to turn anticlockwise and this lever acts on the microswitch 56. Through the cable 54, the microswitch 56 sends to the electronic unit 52 (FIG. 1) the information that the card is now present in the cylindrical structure.

The lever 573 moreover moves the connecting rod 569 upwardly. The lug 567 of the crank 566 can drop from the shoulder 568 of the connecting rod 569, thus permitting the crank 566 and, therefore, the shaft 564 to rotate anticlockwise. The crank 563 also turns anticlockwise and its lug 562 enters the opening 561 fully and blocks the guide 535 for the exit of the card. The connecting rod 569 remains engaged by the lug 567 of the crank 566, as a result of which the lever 573 stays turned anticlockwise and the microswitch remains in the state in which it transmits the information that the card is present in the cylindrical structure.

The shaft 189 causes the cam 532 (FIG. 8) to rotate clockwise and this cam, in turn, causes the lever 527 to turn anticlockwise. The lug 526 of the lever 527 slides on the projection 524 of the lever 522 and remains engaged below it, so that the lever 527 is prevented from following the profile of the cam 532. The lever 527 causes the shaft 528 fast with it to turn anticlockwise and, therefore, the fingers 534 turn anticlockwise and are brought into a position such as close the exit guide for the card and complete the track or path for the processing of the card along the cylindrical structure.

The shaft 189 also causes the cam 271 (FIG. 8) to rotate and, towards the end of the cycle, this cam causes the bail 268 to turn clockwise and, therefore, the bail 262 to turn anticlockwise. The lug 276 releases the projection 277, so that the bail 278 can turn clockwise until it bears by means of the arm 281 against the cam 282. The bail 262 and, therefore, the bail 268 remain in the position reached owing to the engagement of the lug 276 with the projection 277. The bail 262 moreover removes the projection 261 from the path of the lug 251 of the bail 252.

READING OF THE CARD AND PRINTING

The driving shaft 351 (FIGS. 9 and 12), acting through the pulley 352, the belt 353 and the pulley 354, causes the shaft 355 to rotate anticlockwise continuously and, through the coupling between the gears 356, this shaft 355 causes the sleeve 357 to rotate.

The clutch 360 is closed or engaged, as a result of which the rotation of the sleeve 357 is transmitted to the sleeve 359 and, therefore, to the shaft 358. Through the gears 376, the shaft 358 causes the sleeve 378 to rotate anticlockwise. Owing to the coupling between the gears 381 and 382 and, the gear 384 being stationary, the shaft 379 is also rotated anticlockwise and, acting through the gears 388, the shaft 391 and the gears 392 (FIG. 10), causes the shaft 332 (FIG. 2) to rotate anticlockwise.

Due to the coupling between the gears 343 and 344, the shaft 332 causes the gear 344 to rotate clockwise and, therefore, due to the couplings, between the latter and the gears 341 and 342, also keeps the shafts 312, 326 in rotation.

The card is thus fed inside the processing track by the rollers 311 on the shaft 312, by the roller 321, which also provides for maintaining the card aligned with the magnetic strip parallel to the left-hand side of the structure, and finally by the platen 331.

The same macroinstruction which carries the information for introduction of the card into the cylindrical structure also carries the instruction for reading the data recorded on the card. The beginning of the operation of reading the card is controlled by the photodiode 24 which, as soon as the card interrupts the light flux from the lamp 604 to the photodiode, sends a signal to the control unit 20 (FIG. 1). In response to this signal, the control unit 20 enables the buffer 14 to receive the data coming from the magnetic head 16. The data is then sent to the operational store and from this to the basic computing machine, which processes the data.

The card thus completes its first revolution inside the cylindrical structure. On the following passage of the top of the card in front of the photodiode 24 (FIG. 2), the latter sends to the control unit 20 (FIG. 1) a new signal in response to which the control unit 20 calls up the information staticized in the program register 12 for enabling the magnetic head 39 to read the magnetic spot indicating the last line that has been written.

Figures 12, 13, 14:
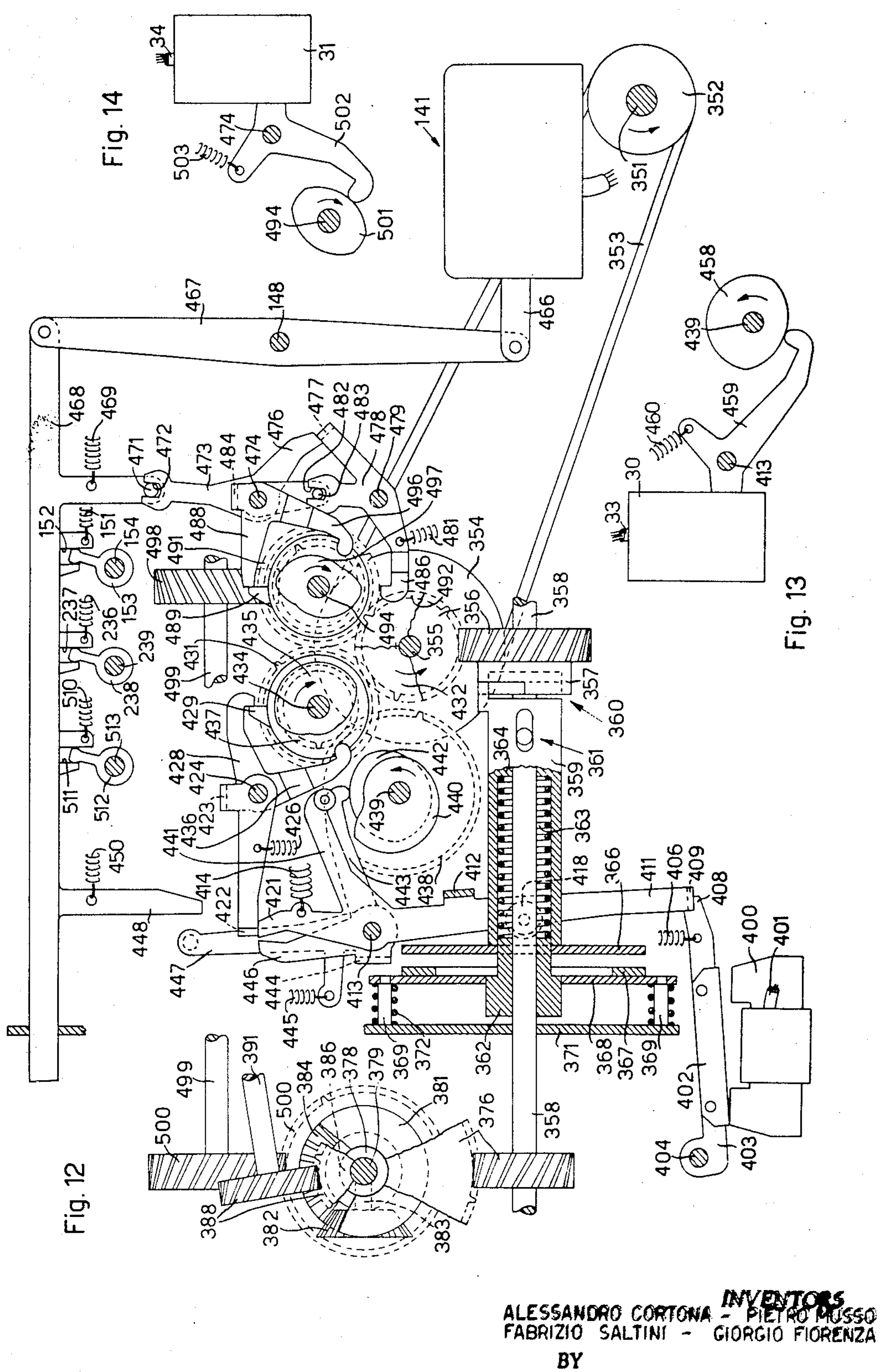
FIG. 12 is a side view of the device of FIG. 9.
FIG. 13 is a side view of a detail of FIG. 9.
FIG. 14 is a side view of another detail of FIG. 9.

When the magnetic head 39 reads the magnetic spot, it sends to the unit 36 a signal which is thereafter transmitted to the unit 28 controlling the movements of the card. By way of the cable 401, the unit 28 finally energizes the electromagnet 400 (FIG. 12). The electromagnet 400 attracts the armature 402, overcoming the action of the spring 406, and causes the crank 403 to turn clockwise. The notch 408 is removed from the path of the lug 409, as a result of which the bail 412 is free to turn clockwise. The bail 412 pushes against the disc 366 by means of the rollers 418 and brings the sleeve 359 to the rear, overcoming the action of the spring 363. The clutch 360 opens and the disc 366 bears against the circular ring 367, thus braking the rotation of the driven part of the clutch 360. The shaft 358 stops and, therefore, the sleeve 378, the shaft 379, the shaft 391 and the shaft 332 also stop. In this way, the gear 344 and the shafts 312 and 326 are stopped, so that the card also stops.

The arm 421 of the bail 412 is removed from the path of the lug 422, so that the bail 423 is free to turn anticlockwise until the arm 436 bears against the cam 435 on the shaft 434. The arm 428 is removed from the path of the dog of the clutch 429, which closes. The shaft 434 begins to rotate and, through the gears 437 and 438, causes the shaft 439 to rotate. The cam 442 allows the bail 444 to turn clockwise so as to bring the projection 446 below the lug 422 of the bail 423, which has meanwhile been recovered by the cam 435.

The clutch 429 is therefore reopened after a cycle of 360°. The shaft 439 rotates in correspondence through 180°. The bail 412, however, remains turned clockwise, since the cam 440 still presents the low portion of its profile to the arm 441.

The shaft 439 causes the eccentric 454 (FIG. 2) to rotate through 180° and the eccentric shifts the connecting rod 455 forward. The connecting rod 455 causes the lever 456 to turn anticlockwise and this lever raises the plates 457 and brings them out of the path of the printing elements 586.

The shaft 439 rotates the cam 458 (FIG. 13) through 180° and this cam causes the lever 459 to turn clockwise. The lever 459 acts on the microswitch 30, which sends to the unit 28 (FIG. 1) through the cable 33 the information that the card is stationary in the cylindrical structure.

In response to this signal and to the preceding reading of the magnetic spot, the unit 28 controlling the movements of the card sends to the control unit 20 through the cable 44 the information that the machine is ready for printing the processed data. The control unit 20 gives the program register 12 permission for carrying out the printing and tabulation instructions, which instructions are sent to the unit 42.

The information relating to the tabulation address and to the data to be printed come from the basic machine through the cable 43. The unit 42 sends the tabulation order and address to the unit 596 through the cable 597 and thereafter sends the data to be printed to the unit 588 (FIG. 2) through the cable 589.

LINE-SPACING

Figure 9:
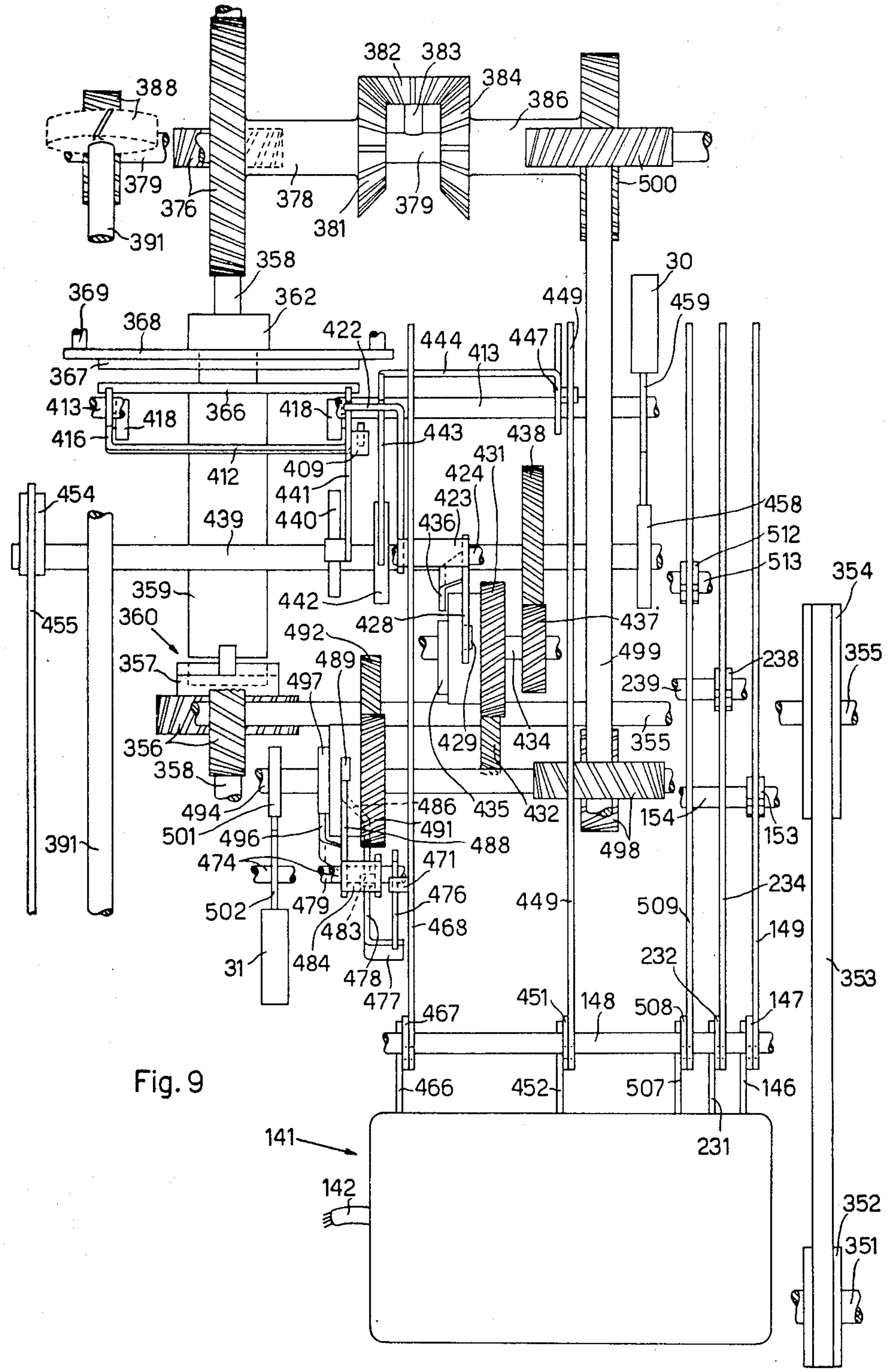
FIG. 9 is a plan view of another device in the machine.

If a single line is not sufficient to contain the data to be printed, the unit 28 commands a fresh cycle of the electromagnets 141 (FIGS. 9 and 12). The sliders 146, 231, 507 and 452 remain stationary, while the slider 466 is pulled forward. The lever 467 turns anticlockwise, pushing the bar 468 backward and this bar, in turn, causes the lever 473 to turn anticlockwise. The projection 476 releases the lug 477, as a result of which the lever 478 can turn anticlockwise, while the bail 484 turns clockwise until it bears against the cam 497. Moreover, the bail 484 removes the stop 488 from the clutch 489, which closes.

The shaft 494 begins to rotate and, by means of the cam 497, recovers the bail 484 and the lever 478 connected thereto. The lug 477 returns into engagement with the projection 476 of the lever 473, which has meanwhile returned to the inoperative position, so that the lever 478 and the bail remain in the inoperative position. The dog of the clutch 489 thus encounters the stop 486 and the shaft 494 stops after a rotation of 180°.

Through the two gears 498, the shaft 499 and the two gears 500, the shaft 494 causes the sleeve 386 to rotate anticlockwise. Due to the coupling between the gears 384 and 382 and the gear 381 being stationary, this sleeve causes the shaft 379 to rotate anticlockwise and, therefor, through the gears 388, the shaft 391 and the gears 392, causes the shaft 332 to rotate anticlockwise. In the manner already described, the shaft 332 causes the card to advance inside the cylindrical structure by an amount corresponding to a line space.

As the shaft 494 rotates, it also carries along a cam 501 (FIG. 14), which causes microswitch lever 502 to turn anticlockwise and act on the miscroswitch 31. Through the cable 34, the microswitch 31 supplies to the unit 28 (FIG. 1) and, therefore, to the control unit 20, the information that a line-spacing operation has been effected.

The printing operation having been completed, the program register 12, after permission from the control unit 20, enables the unit 36 to record by means of the head 39 a second magnetic spot for identifying the last line written on the card.

RECORDING OF DATA AND EJECTION OF CARD

The recording of the magnetic spot having taken place, the control unit 20 (FIG. 1) enables the programmer register to send to the unit 28 the information for starting a fresh cycle of the electromagnets 141 (FIGS. 9 and 12).

The actuation of this cycle of the electromagnets 141 leaves the sliders 146, 231, 507 and 466 stationary, while the slider 452 is pulled forward. The lever 451 turns anticlockwise and pushes the bar 449 to the rear and, by means of the lug 448, this bar acts on the arm 447 of the bail 444. The bail 444 turns anticlockwise, releasing the lug 422 of the bail 423 from the arm 446. The bail 423 is thus also free to turn anticlockwise, in such manner as to remove the arm 428 from the path of the dog of the clutch 429, which closes. The shaft 434 again begins to rotate and, through the gears 437 and 438, causes the shaft 439 to rotate anticlockwise.

The cam 442 bears against the arm 443 of the bail 444, holding it in the turned position now reached. Moreover, the shaft 439 rotates the cam 440, which acts on the arm 441 of the bail 412, causing it to turn anticlockwise. The bail 412 brings the arm 421 into the path of the lug 422 of the bail 423, which has meanwhile been recovered by the cam 435. The arm 428 returns into the path of the dog of the clutch 429, which therefore opens after a cycle of 360°. Thus, the shaft 439 stops after a rotation of 180°.

The bail 412 now permits the disc 366 and, therefore, the sleeve 359 to move forward under the action of the spring 363. The sleeve 359 engages with the sleeve 357 and therefore begins to rotate again, setting the shaft 332 in rotation in the manner already described. The card therefore starts to revolve again inside the cylindrical structure.

The shaft 439 moreover causes the eccentric 454 (FIG. 2) to rotate through 180° and this eccentric brings the connecting rod 455 back to the rear into the position shown in the drawing. The connecting rod 455 causes the lever 456 to run clockwise and brings the plates 457 back into correspondence with the printing elements 586.

The shaft 439 also causes the cam 458 (FIG. 13) to rotate through 180° and the cam allows the lever 459 to turn anticlockwise and return to the position shown in the drawing. The lever 459 acts on the microswitch 30 which sends to the unit 28 (FIG. 1) through the cable 33 the information that the card in motion inside the cylindrical structure.

When the top of the card comes into correspondence with the photodiode 24 (FIG. 2) again, the photodiode sends a signal to the control unit 20 (FIG. 1), which enables the buffer 14 to receive the new data from the operative store 10 and send it to the magnetic head 16 for recording.

The card thus begins a further revolution in the processing track. On the passage of the tail or end of the card in front of the photodiode 24, the photodiode sends a signal to the control unit 20. The control unit 20 then enables the program register 12 to actuate the instruction for ejection of the card. This instruction is sent to the unit 28, which causes a fresh cycle of the electromagnets 141 (FIGS. 9 and 12) to start.

The execution of the cycle of the electromagnets 141 leaves the sliders 146, 231, 452 and 466 stationary, while it shifts the slider 507 forward. The lever 508 turns anticlockwise and shifts the bar 509 to the rear, this bar causing the crank 512 and, therefore, the shaft 513 to turn anticlockwise. The shaft 513, in turn, causes the crank 514 (FIG. 8) to turn anticlockwise and the crank shifts the bar 517 to the rear and causes the lever 522 to turn clockwise.

The projection 524 releases the lug 526 of the lever 527, which turns clockwise until it bears against the cam 532. The lever 527 causes the shaft 528 fast therewith to rotate and shifts the fingers 534 into the position shown in the drawing so as to convey the card into the guide 535 for exit from the cylindrical structure.

The program register 12 (FIG. 1) is enabled by the control unit 20 to send to the unit 36 an instruction for erasure of the first magnetic spot encountered on the card. When the card passes in front of the head 39, the first magnetic spot is therefore erased and only the magnetic spot relating to the last line that has been written is left behind.

The card in the exit guide 535 (FIG. 2) is seized by the rollers 544 on the shaft 546, which is kept continuously in motion by the gears 548 and the shaft 549, which receives its motion from the driving shaft 103 through the gears 551.

In the guide 535, the card encounters the lug 562 (FIG. 15) of the crank 563, which is therefore turned clockwise. The crank 563 causes the shaft 564 and, therefore, the crank 566 to turn clockwise until the lug 567 is brought out of engagement with the connecting rod 569. The connecting rod 569 drops, while the lever 573 turns clockwise. The lever 573 acts on the microswitch 56, which sends to the unit 52 (FIG. 1) the information that the card has emerged from the processing track.

MAKING OUT A NEW CARD

If the card is new, it obviously does not bear any magnetic spot indicating the last line. If the magnetic head 39 does not detect a spot, the card stops when its tail uncovers the photodiode 23. With the card stationary, the reading of the character which is in correspondence with the head 16 is effected. If the card proves to be recorded, there is started by the program a sequence for ejection of the card, in as much as the card is obviously impaired and therefore unusable. If the card does not prove to be recorded, then it is set in motion again in the cylindrical structure and is stopped, by program, when its head or top covers the photodiode 24. In this position, a magnetic spot is recorded automatically by program. The stages of printing, recording of the magnetic spot in correspondence with the last line written and recording of the data then occur in succession. At this point, the card is ejected and, as already described, the first magnetic spot recorded is erased.

INTRODUCTION OF A CARD WHICH IS ALREADY USED UP

If the magnetic spot is read within a certain space of time after the tail of the card has uncovered the photodiode 23 (FIG. 2), the control unit 20 causes a special program sequence to start which provides for ejecting the card immediately.

The card may also be used up by successive line-spacing operations. Even in this case, if, after the command for effecting the line-spacing, the photodiode 23 is uncovered, the control unit 20 causes a program sequence to start for ejection of the card.

INTRODUCTION OF THE FOLLOWING CARD

At any instant following the insertion of the card into the processing track, the control unit 20 can enable the program register 12 to actuate the instruction for starting a cycle of the electromagnets 141 for freeing the introduction hopper 60. The carrying out of this instruction through the unit 28 leaves the sliders 146, 507, 452, and 466 (FIG. 9) stationary, while the slider 231 is pulled forward. The lever 232 turns anticlockwise and shifts the bar 234 to the rear, this bar causing the crank 238 and, therefore, the shaft 239 to rotate.

In turn, the shaft 239 causes the crank 241 (FIG. 8) to turn anticlockwise and the crank shifts the bar 243 to the rear. The bar 243 causes the lever 248 to turn clockwise and this lever removes the projection 249 from the path of the lug 251 of the bail 252. The bail 252 turns clockwise and removes the projection 256 from the path of the dog of the clutch 100, which closes. The shaft 110 begins to rotate. After a rotation of 180°, the dog of the clutch 100 encounters the projection 99 of the bail 96 (FIG. 5) and the clutch 100 is reopened.

The rotation of the cam 259 (FIG 8) through 180° retrieves the bail 252 and brings the lug 251 back into engagement with the projection 249 of the lever 248, which has meanwhile been returned to rest. On the other hand, the rotation of the cam 282 through 180° leaves the bail 278 stationary since the cam 282 has a circular profile portion.

The cam 112 (FIG. 5) now presents a low portion of its profile to the arm 111 of the bail 96, but the bail 96 is preventing from turning by the engagement of the lug 94 with the notch 93.

Finally, the eccentric 116 causes the lever 188 to turn anticlockwise and the lever raises the connecting rod 119. The connecting rod 119 causes clockwise rotation of the crank 121 (FIG. 6) and, therefore, of the shaft 122. The shaft 122, in turn, causes the crank 123 to turn clockwise and the crank 123 allows the bail 77 to turn until the roller 73 is brought into engagement with the driving roller 65

The connecting rod 119 also causes the crank 217 (FIG. 5) and the shaft 208 to turn clockwise. The shaft 208, in turn, causes the cranks 213 to turn clockwise and these cranks bring the rollers 204 back into the position shown in the drawing by means of the levers 207. The projections 220 emerge from the hopper 60, thus clearing the path for the introduction of a new card.

Obviously, as long as the card which is in the processing stage has not been ejected, the control unit 20 (FIG. 1) does not permit the extraction from the program register 12 of the instruction for introducing the new card into the cylindrical structure.

The connecting rod 119 also causes the lever 128 (FIG. 6) to pivot clockwise and this lever acts on the microswitch 29, which sends to the unit 28 (FIG. 1) the information that the projections 220 are out of the introduction hopper.

The shaft 110 also causes the cam 221 (FIG. 15) to rotate through 180°, but this cam has a circular profile portion, so that its rotation has no effect.

CARD JAMMED IN THE MACHINE

It may happen that, due to trouble of some kind, a card remains inside the machine. The two microswitches 55 and 56 signal to the unit 52 the position in which the card has remained, that is whether it is in the hopper 60 or in the cylindrical structure. The depression of the key causes this information to be sent to the control key 57 20, which starts the appropriate program sequence for extracting the card from the machine.

More particularly, if there is a card in the cylindrical structure, it is ejected directly; if there is a card in the hopper, it is first introduced into the cylindrical structure and then ejected; if there is a card in the hopper and a card in the cylindrical structure, this latter card is ejected in the first cycle, the first card is carried from the hopper to the cylindrical structure in a second cycle and is ejected in a third cycle.

We claim:

1. A machine for processing magnetic ledger cards of the type provided with a magnetic strip on which there is recorded specific accounting information comprising:
   - a hopper, having a side and a base, for receiving a card with the magnetic strip parallel to the direction of the movement of insertion;
   - a processing station including:
     - a. means including a fixed housing for defining a substantially cylindrical path;
     - b. means for circulating the card along said cylindrical path, including drive means disposed about the boundary of said path;
     - c. magnetic head means fixedly disposed in said cylindrical path for reading and recording information on said magnetic strip;
     - d. selectively operable means for ejecting the card from said cylindrical path; and,
     - e. means for transporting said card from said hopper to said cylindrical path.

2. A machine according to claim 1, further comprising means for aligning the card against said side and said base of the hopper, said processing station including a side of said cylindrical path and means for keeping the card constantly aligned against said side of the cylindrical path.

3. Machine according to claim 2, further comprising means for sensing when the card is aligned in said hopper and means enabled by said sensing means for starting the aligned card into said transporting means for being transported to said processing station.

4. A machine according to claim 3, further comprising two-position preventing means actuated by said alignment-sensing means to a first position in said hopper for preventing the introduction of a second card, and control means operative upon the insertion of the first-entered card into said cylindrical path for resetting said preventing means to a second position outside said hopper for allowing the insertion of a second card into said hopper while the first card is in the cylindrical path.

5. A machine according to claim 4, further comprising a control unit means for controlling the processing of said card in said processing station, means for sensing in each cycle of the card the passage of an edge of the card past a point in said cylindrical path and means operative in conjunction with said edge sensing means and information sensed by said magnetic head means for conditioning said control unit to order a selected set of operations on said card.

6. Machine according to claim 5, wherein the processing station includes a printing device disposed in a predetermined position in said cylindrical path, said printing device being controlled by said control unit for printing information on said card, and means for tabulating said printing device.

7. A machine according to claim 6, wherein said cylindrical path defining means includes a two-position member movable under the control of said control unit to its first position covering said printing device when the card is moving under the control of said card circulating means and to its second position uncovering said printing device when said card is stopped for allowing a printing operation on said card.

8. A machine according to claim 7, wherein said cylindrical path defining means further includes a two-position element controlled by said control unit, said two-position element forming in its first position a portion of the cylindrical path and being shiftable to its second position to protrude into said path for deflecting said card from said cylindrical path to said ejecting means.

9. A machine according to claim 8, wherein said processing station further includes a second magnetic head means controlled by said control unit means for reading and recording on the magnetic strip of the card a mark identifying the last line printed, said control unit means being responsive to the reading of said mark for controlling said card circulating means to arrest the card in the correct printing position, the second magnetic head means being controlled by said control unit means for erasing the magnetic mark recorded in the preceding operation as the card is ejected.

10. Machine according to claim 9, wherein said control unit includes means responsive to the absence of a signal indicating the sensing by said magnetic heads of magnetic signals recorded on said magnetic strip during the time interval that said edge-sensing means indicates the passage of the entire card past said magnetic heads for causing said second magnetic head to record a magnetic mark in correspondence with the first line to be printed.

11. Machine according to claim 10, wherein said edge-sensing means includes means located a predetermined distance before said printing device in said cylindrical path for sensing the trailing edge of said card, said control unit means being responsive to the sensing by said second magnetic head of the magnetic mark on said strip after the sensing of said trailing edge by said trailing edge-sensing means for actuating said two position element into its said second position for deflecting said card into said ejecting means.

12. A machine according to claim 10, comprising means for line-spacing the card, the second magnetic head means being controlled by said control unit means for erasing the magnetic mark recorded in correspondence with the preceding line and for recording a second magnetic mark in correspondence with the next line.

* * * * *